June 9, 1936. O. R. WIKANDER 2,043,566
MULTIPLE COIL FRICTION DEVICE
Filed May 17, 1935 3 Sheets-Sheet 1

INVENTOR
Oscar R. Wikander
by
Byrnes, Stebbins & Blenko.
His Attys.

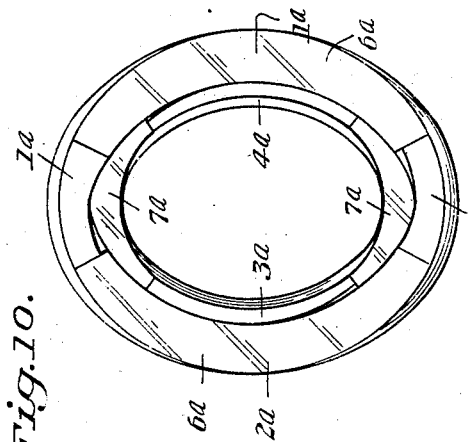
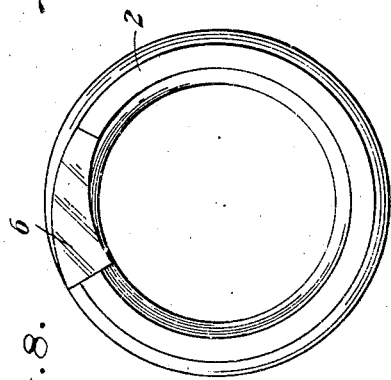
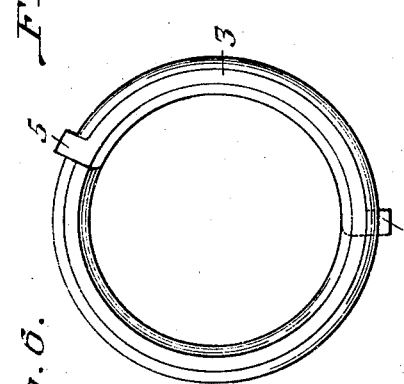
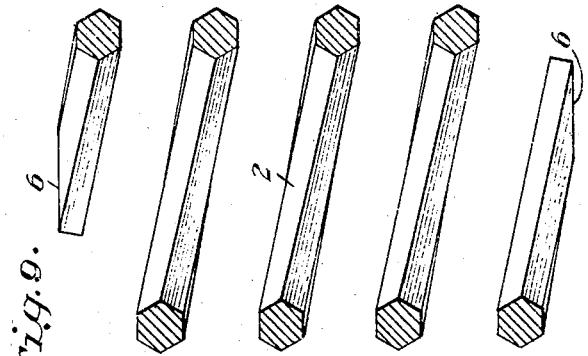
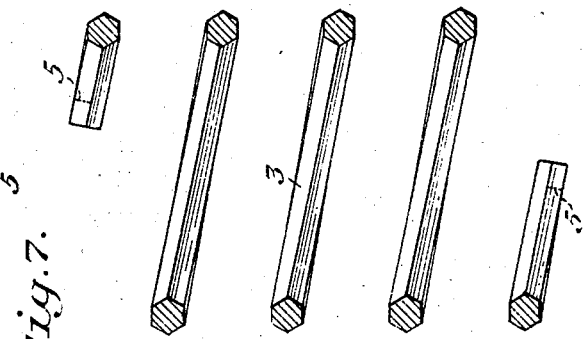

June 9, 1936.  O. R. WIKANDER  2,043,566
MULTIPLE COIL FRICTION DEVICE
Filed May 17, 1935  3 Sheets-Sheet 3
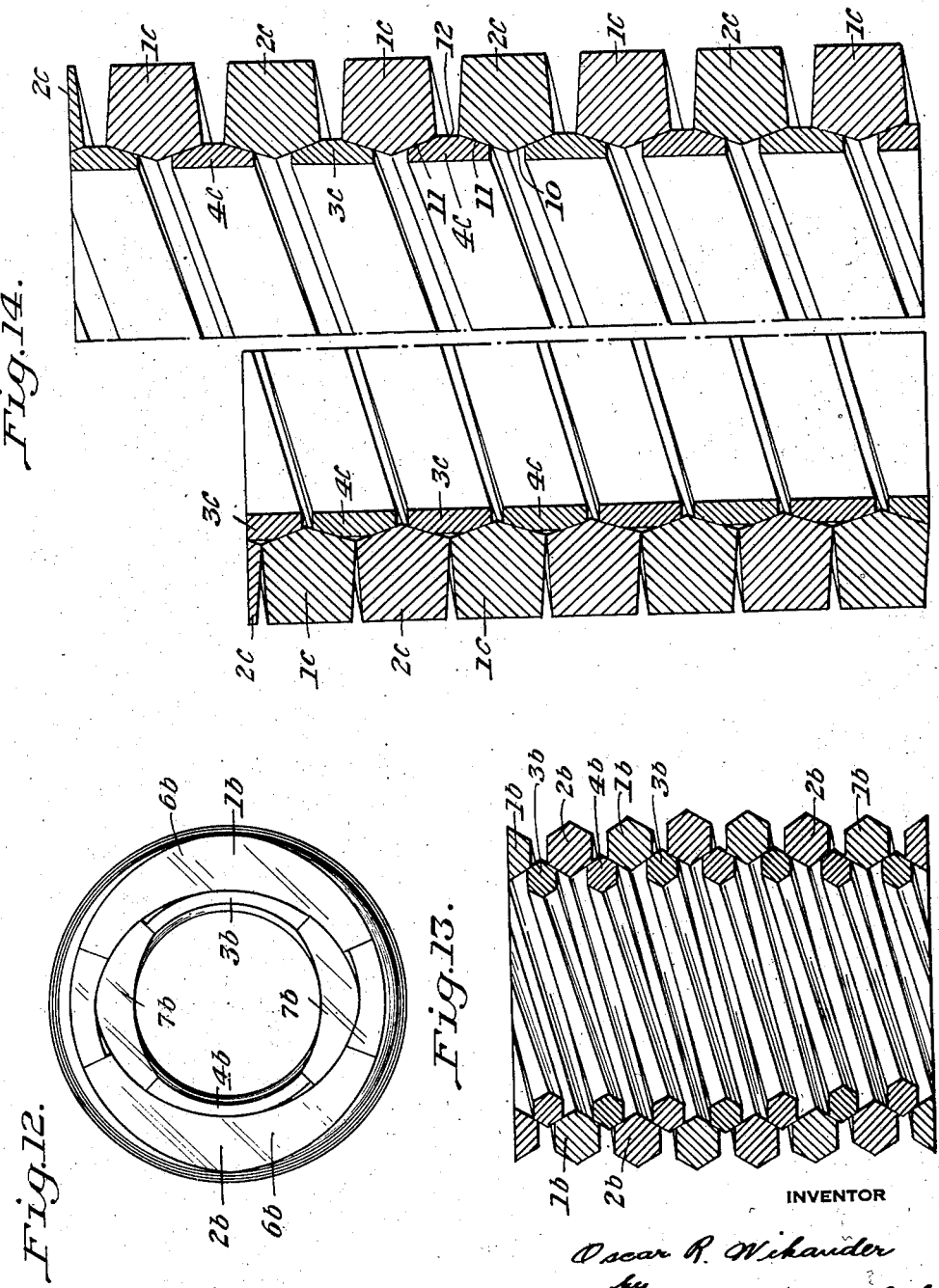

Patented June 9, 1936

2,043,566

UNITED STATES PATENT OFFICE 2,043,566

MULTIPLE COIL FRICTION DEVICE

Oscar R. Wikander, Pittsburgh, Pa., assignor to Edgewater Steel Company, Oakmont, Pa., a corporation of Pennsylvania Application May 17, 1935, Serial No. 22,009

15 Claims. (Cl. 267—61)

This invention relates to multiple coil friction devices, and more particularly to such devices which have a fairly uniformly increasing frictional as well as elastic resistance extending over the full travel of the device. The invention is particularly valuable in that it provides an apparatus of great amplitude and with very desirable compression characteristics.

Friction devices having inner and outer coils provided with tapered engaging surfaces so as to develop friction upon compression of the device are known. One such device is disclosed in Harvey Patent No. 758,066. In the Harvey device, the inner and outer coils are spaced from each other under small loads and only contact with each other so as to develop frictional resistance under larger loads. This is necessary in order to get long travel. During the first part of the travel of the spring, the device offers only elastic resistance, but as soon as the inner and outer coils contact with each other, it offers both elastic and frictional resistance. At the beginning of the second part of its travel, that is, when the inner and outer coils are in contact with each other, its rate of compression is suddenly and intensively increased, not only on account of the work necessary to overcome the friction between the adjacent coils, but also because of the amount of work required to increase the diameters of the outer coil and decrease those of the inner coil. The resulting spring characteristics seriously limit the range of usefulness of the apparatus.

The disadvantages of such previous devices are overcome in the present invention. I provide outer and inner multiple coil members; that is to say, the members consist of a plurality of parallel inter-twined coils. By this means, the inner coil members may be kept in contact with the outer coil members so as to develop frictional resistance during the entire travel of the device (or any desired part thereof). Preferably, the outer parallel connected coils are of greater cross-section than the cross-section of the inner coil or coils, the outer coils acting as powerful helical coil springs which furnish the major part of the load-carrying capacity of the device, the main function of the inner coil or coils being to produce frictional resistance. By so choosing inner and outer members of different cross-section, and by using multiple coil members, long travel and highly desirable spring characteristics may be obtained. Where the inner coils are of small cross-section, the work required for compressing the same to smaller diameter is not unduly great, yet a substantially uniform and desirable frictional resistance, occasioned by engagement with the outer coil member, is secured. Other advantages are pointed out below.

The accompanying drawings illustrate several embodiments of my invention, it being understood that these are given for illustrative purposes and not by way of limiting the invention thereto.

In the drawings,—

Figure 3 being a plan view and Figures 4 and 5 elevations;

Figure 6 is a plan view and Figure 7 is a longitudinal section of one of the inner coils;

Figure 8 is a plan view and Figure 9 is a longitudinal section of one of the outer coils;

Figure 10 is a plan view and Figure 11 a longitudinal section through a different embodiment of the invention, Figure 11 showing the parts fully compressed;

Figure 12 is a plan view and Figure 13 a longitudinal section of another form of the invention, Figure 13 illustrating the parts in their fully extended positions; and Figure 14 is a composite longitudinal section through another embodiment of the invention, the right-hand half of the figure showing the parts in their extended positions, and the left-hand part of the figure showing them in their fully compressed positions.

Figure 1:
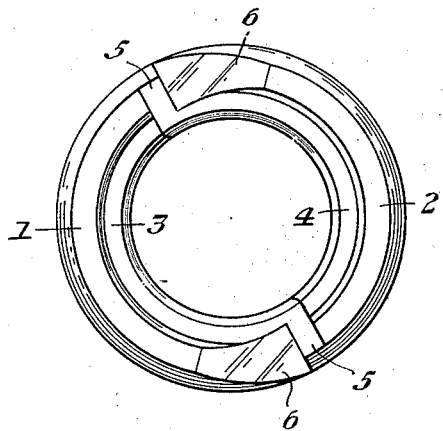
Figure 1 is a plan view and Figure 2 is an elevation, partly in section, of one form of friction device.
Figure 3:
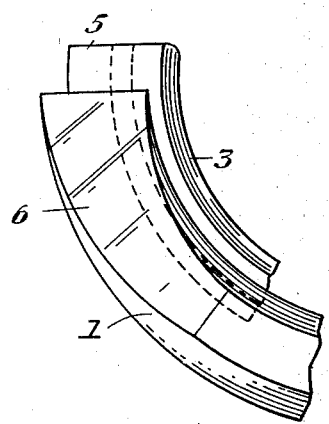
Figures 3, 4 and 5 are detail views to an enlarged scale illustrating the stops on the inner coil which prevent the coils unscrewing from each other.
Figure 2:
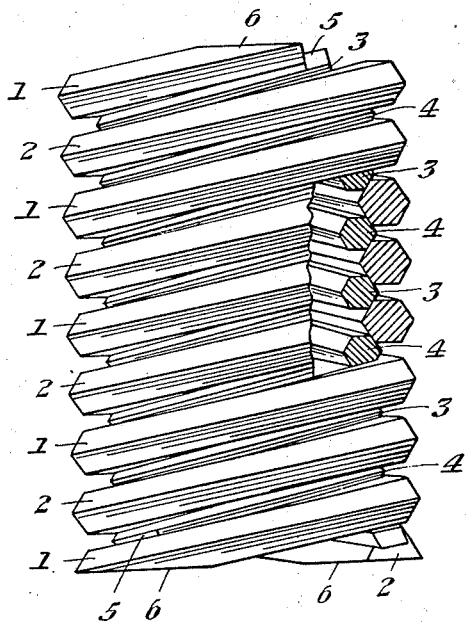
Figure 4:
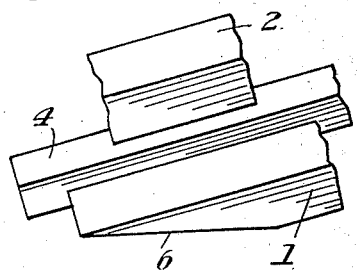
Figure 5:
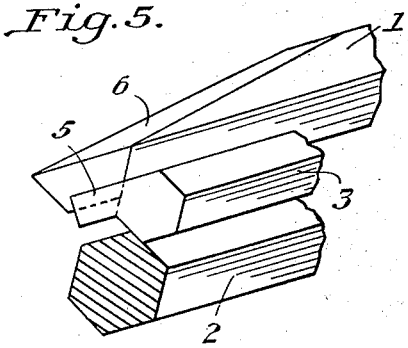

Referring now to the embodiment illustrated in Figures 1 through 9, the device comprises outer parallel intertwined helical coils 1 and 2, and inner parallel inter-twined helical coils 3 and 4. Thus, the turns of the outer coil 2 lie between the adjacent turns of the outer coil 1, and the turns of the inner coil 3 lie between the adjacent turns of the inner coil 4. The inner coils 3 and 4 are threaded into the outer coils 1 and 2.

The inner and outer coils are hexagonal in cross-section and each of the outer coils 1 and 2 is of greater cross-section than the cross-section of each of the coils 3 and 4. The parallel intertwined outer coils 1 and 2 act as powerful helical coil springs furnishing the major part of the load-carrying capacity of the device. The inner coils 3 and 4 are of substantially smaller cross-section, their function being principally to produce frictional resistance to the compression and expansion of the outer coils 1 and 2.

In order to prevent the inner and outer coils from unscrewing relative to each other upon compression and expansion, the inner coils 3 and 4 are bent outwardly at their ends to form stops 5 which contact with the ends of the outer coils 1 and 2. One of the stops 5 on the coil 3 bears against, or at least lies adjacent to, one end of the outer coil 1, and the other stop is similarly disposed relative to the opposite end of the outer coil 2, when the device is fully extended. The stops on the inner coil 4 cooperate in a like manner with the remaining ends of the outer coils 1 and 2. The ends 6 of the coils 1 and 2 are flattened to provide bearing surfaces.

Referring now to Figures 10 and 11, the device consists of outer coils 1a and 2a, and inner coils 3a and 4a. The portions 6a of the coils 1a and 2a and the portions 7a of the coils 3a and 4a are flattened to provide bearing surfaces. Each of the inner and outer coils is coiled so that the device is oval in shape in a plane transverse to its longitudinal axis. The oval shape of the coils, especially if it is pronounced, will counteract or practically eliminate all tangential relative movement of the outer and inner coils, thereby changing the characteristics of the friction device to a desired extent and materially increasing the capacity and resistance, though generally decreasing the travel of the device slightly. This embodiment is particularly suited for use as a draft gear friction device. The oval shape of the springs automatically counteracts any tendency of the individual coils to unscrew.

Another method of counteracting the tendency of the coils to unscrew from each other is illustrated in Figures 12 and 13. This embodiment also provides parallel inter-twined outer coils 1b and 2b, and parallel inter-twined inner coils 3b and 4b. The portions 6b of the coils 1b and 2b, and the portions 7b of the coils 3b and 4b are flattened to provide bearing surfaces. The device is barrel-shaped in longitudinal section, that is, the coil diameters of the inner and outer coils decrease from the mid-portion of the device towards its ends. This adequately holds the inner and outer coils in the proper relative positions.

Figure 14 illustrates another embodiment which comprises outer coils 1c and 2c, and inner coils 3c and 4c. This embodiment is similar to that of Figure 2, except for the cross-section of the inner and outer coils. The outer coils 1c and 2c have inwardly tapering surfaces 10 which contact with outwardly tapering surfaces 11 on the inner coils 3c and 4c. The surfaces 11 are connected by a flat surface 12.

My friction device is suitable for the suspension of static loads and may be advantageously used in lieu of ordinary coil springs, especially where space limitations prevent the use of an ordinary coil spring of sufficient power. The necessary strength for sustaining the static load is obtained by the use of a plurality of coils of sufficient load-carrying and recoil capacity. The desired degree of resistance to deformation is obtained by the coacting frictional coils.

Due to the employment of a plurality of inter-twined coils, the friction work may be spread over the whole length of the spring travel or over any desired part thereof. The device may be used alone, or in certain cases, e. g. in truck springs, it may be used with a desired number of frictionless coil springs.

An important advantage of my invention is that the coils are active for substantially their entire length. In ordinary coil springs it is customary to arrange the end coils so they have bearing around a major portion of the coil circle. If this is not done, the spring will tend to bow when compressed, thus interfering with its proper action. In consequence, the end coils are "dead" and must be discounted in figuring the power of the spring. With my improved device, any tendency of one coil to bow in one direction is offset by a corresponding tendency of the inter-twined coil to bow in the opposite direction, so the spring does not bow as a whole, and individual bowing of the coils is prevented by the inner coils.

The present invention, as contrasted with the Harvey spring previously referred to, may be arranged to provide continuous contact between the inner and outer coils during the entire travel of the spring, thereby producing a fairly uniform rate of spring compression and rate of increase of frictional resistance during the whole travel of the spring. The cross-sectional area of the inner coils may be reduced to any desired degree (within reason), thereby reducing the amount of work required to compress the device and to overcome the friction between the coils.

The rate of spring compression of my device is increased due to the use of a plurality of parallel coils, the total rate of spring compression being equal to the sum of those of the individual parallel connected coils. This means of increasing the rate of spring compression is very effective since if a single coil spring is replaced by two parallel coil springs of the same cross-sectional area, coil diameter, and total number of turns, the rate of spring compression becomes four times larger.

The work required to radially compress the inner coil springs is materially reduced because of the reduction of their cross-sectional area, and overstressing of the outer coils is prevented even if the inner coils are compressed beyond their yield point.

I have illustrated and described several embodiments of my invention. It is to be understood, however, that the invention may be otherwise embodied within the scope of the following claims.

I claim:

1. A multiple coil friction device comprising a plurality of inter-twined helical outer coils, and an inner coil, the inner and outer coils having contacting surfaces which are inclined to the axis of the device.

2. A multiple coil friction device comprising a plurality of inter-twined helical outer coils and a plurality of inter-twined inner coils, the inner and outer coils having contacting surfaces which are inclined to the axis of the device.

3. A multiple coil friction device comprising a plurality of inter-twined helical outer coils, and an inner coil, the inner and outer coils having contacting surfaces which are inclined to the axis of the device, the outer and inner coils being hexagonal in cross-section.

4. A multiple coil friction device comprising a plurality of inter-twined helical outer coils, and an inner coil, the inner and outer coils having contacting surfaces which are inclined to the axis of the device, the cross-section of each outer coil being greater than the cross-section of the inner coil.

5. A multiple coil friction device comprising a plurality of inter-twined helical outer coils, and an inner coil, the inner and outer coils having contacting surfaces which are inclined to the axis of the device, the outer and inner coils being hexagonal in cross-section, the cross-section of each outer coil being greater than the cross-section of the inner coil.

6. A multiple coil friction device comprising a plurality of inter-twined helical outer coils and a plurality of inter-twined inner coils, the inner and outer coils having contacting surfaces which are inclined to the axis of the device, the outer and inner coils being hexagonal in cross-section.

7. A multiple coil friction device comprising a plurality of inter-twined helical outer coils and a plurality of inter-twined inner coils, the inner and outer coils having contacting surfaces which are inclined to the axis of the device, the cross-section of each outer coil being greater than the cross-section of each inner coil.

8. A multiple coil friction device comprising a plurality of inter-twined helical outer coils and a plurality of inter-twined inner coils, the inner and outer coils having contacting surfaces which are inclined to the axis of the device, the outer and inner coils being hexagonal in cross-section, the cross-section of each outer coil being greater than the cross-section of each inner coil.

9. A multiple coil friction device comprising a plurality of inter-twined helical outer coils, an inner coil, the inner and outer coils having contacting surfaces which are inclined to the axis of the device, and means for preventing the outer and inner coils from unscrewing relative to each other.

10. A multiple coil friction device comprising a plurality of inter-twined helical outer coils, an inner coil, the inner and outer coils having contacting surfaces which are inclined to the axis of the device, and stops on the inner coil contacting with the ends of the outer coils to prevent the coils from unscrewing.

11. A multiple coil friction device comprising an outer coil member and an inner coil member, the outer and inner coil members having contacting surfaces which are inclined to the axis of the device, at least one of the members consisting of a plurality of inter-twined coils.

12. A multiple coil friction device comprising an outer coil member and an inner coil member, the outer and inner coil members having contacting surfaces which are inclined to the axis of the device, at least one of the members consisting of a plurality of inter-twined coils, the cross-section of the outer coil member being greater than the cross-section of the inner coil member.

13. A multiple coil friction device comprising an outer coil member and an inner coil member, the outer and inner coil members having contacting surfaces which are inclined to the axis of the device, at least one of the members consisting of a plurality of inter-twined coils, the outer and inner coil members being coiled so that the friction device is non-circular in a plane transverse to its longitudinal axis.

14. A multiple coil friction device comprising an outer coil member and an inner coil member, the outer and inner coil members having contacting surfaces which are inclined to the axis of the device, at least one of the members consisting of a plurality of inter-twined coils, the outer and inner coil members being coiled so that the friction device is oval in a plane transverse to its longitudinal axis.

15. A multiple coil friction device comprising an outer coil member and an inner coil member, the outer and inner coil members having contacting surfaces which are inclined to the axis of the device, at least one of the members consisting of a plurality of inter-twined coils, the coil diameters of the inner and outer coil members decreasing from their mid-portion toward their ends.

OSCAR R. WIKANDER.